United States Patent
Sahawneh et al.

(10) Patent No.: US 11,926,342 B2
(45) Date of Patent: Mar. 12, 2024

(54) AUTONOMOUS VEHICLE POST-ACTION EXPLANATION SYSTEM

(71) Applicant: Motional AD LLC, Boston, MA (US)

(72) Inventors: Laith Sahawneh, Murrysville, PA (US); Bence Cserna, East Boston, MA (US)

(73) Assignee: Motional AD LLC, Boston, MA (US)

( * ) Notice: Subject to any disclaimer, the term of this patent is extended or adjusted under 35 U.S.C. 154(b) by 107 days.

(21) Appl. No.: 17/463,438

(22) Filed: Aug. 31, 2021

(65) Prior Publication Data
US 2023/0065339 A1 Mar. 2, 2023

(51) Int. Cl.
*B60W 60/00* (2020.01)
*B60W 30/09* (2012.01)
*B60W 30/095* (2012.01)
*B60W 40/02* (2006.01)
*B60W 50/14* (2020.01)
*G08G 1/16* (2006.01)

(52) U.S. Cl.
CPC ........ *B60W 60/0015* (2020.02); *B60W 30/09* (2013.01); *B60W 30/0956* (2013.01); *B60W 40/02* (2013.01); *B60W 50/14* (2013.01); *G08G 1/162* (2013.01); *G08G 1/165* (2013.01); *G08G 1/166* (2013.01); *B60W 2050/146* (2013.01); *B60W 2554/20* (2020.02); *B60W 2554/40* (2020.02); *B60W 2556/45* (2020.02)

(58) Field of Classification Search
CPC ............. B60W 60/0015; B60W 30/09; B60W 30/0956; B60W 40/02; B60W 50/14; B60W 2050/146; B60W 2554/20; B60W 2554/40; B60W 2556/45; B60W 60/0011; B60W 60/0027; B60W 2050/0031; G08G 1/162; G08G 1/165; G08G 1/166; B60K 2370/162; B60K 2370/175
See application file for complete search history.

(56) References Cited

U.S. PATENT DOCUMENTS

| 9,415,777 B2 | 8/2016 | Clarke et al. |
| 10,372,130 B1 | 8/2019 | Kaushansky et al. |
| 2018/0217601 A1 | 8/2018 | Marcoux et al. |
| 2019/0129831 A1* | 5/2019 | Goldberg ............ G06F 3/04847 |

(Continued)

OTHER PUBLICATIONS

[No Author Listed], "Surface Vehicle Recommended Practice: Taxonomy and Definitions for Terms Related to Driving Automation Systems for On-Road Motor Vehicles," SAE International, Standard J3016, Sep. 30, 2016, 30 pages.

*Primary Examiner* — Jason Holloway
(74) *Attorney, Agent, or Firm* — Fish & Richardson P.C.

(57) ABSTRACT

Among other things, techniques are described for notifying and explaining the action performed by an autonomous vehicle, including but not limited to: receiving a planned path of a vehicle, a state of the vehicle and environment data of an environment in which the vehicle is operating, receiving a deviation signal, determining whether the deviation signal was reported by a first system or a second system of the vehicle, in response selecting a first set of simulators or a second set of simulators for simulating the vehicle in the environment, simulating the vehicle in the environment using the selected first or second set of simulators, based on results of the simulating, generating a message and presenting the message to at least one occupant of the vehicle.

20 Claims, 12 Drawing Sheets

(56) References Cited

U.S. PATENT DOCUMENTS

| | | | |
|---|---|---|---|
| 2020/0010077 A1* | 1/2020 | Cormack | B60W 50/087 |
| 2021/0165932 A1* | 6/2021 | Mohan | G06F 11/3476 |
| 2021/0237759 A1 | 8/2021 | Wray et al. | |
| 2022/0161811 A1* | 5/2022 | Lu | B60W 60/0059 |

* cited by examiner

AUTONOMOUS VEHICLE POST-ACTION EXPLANATION SYSTEM

FIELD OF THE INVENTION

This description relates to systems, methods, and computer program products for notifying and explaining actions performed by an autonomous vehicle to individuals in proximity to the vehicle.

BACKGROUND

Autonomous vehicles (AVs) can use path planning to plan a route from a starting location to an ending location. A route is specified and the vehicle proceeds along the route. The AV can temporarily or suddenly deviate from the route. For example, an AV can suddenly deviate from a planned path to avoid an imminent collision or to maintain a predefined lateral clearance to nearby objects. Such unexpected deviation might cause confusion among passengers or to remote operators at the command center.

DETAILED DESCRIPTION

Figure 1:
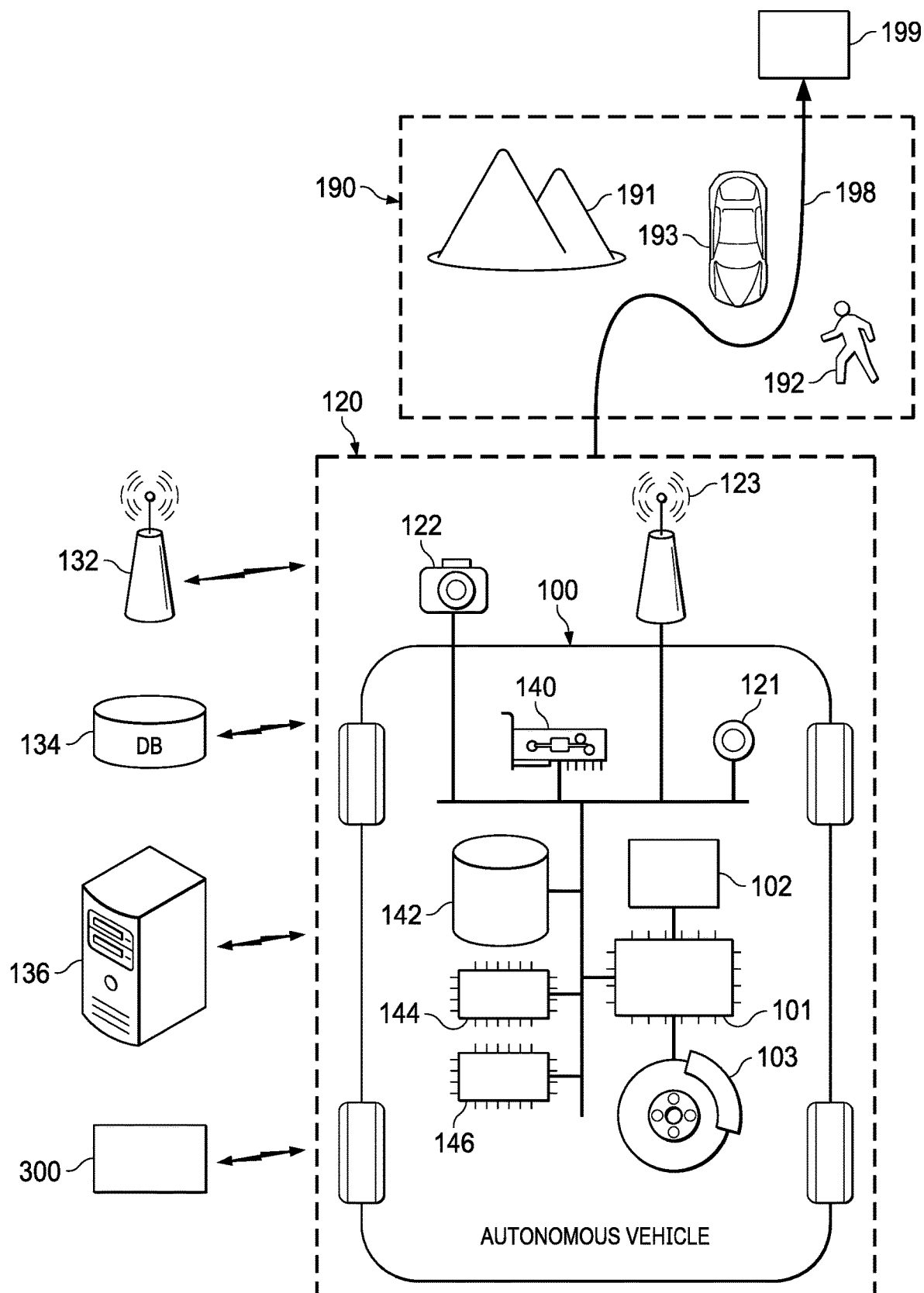
FIG. 1 shows an example of an autonomous vehicle (AV) having autonomous capability.

In the following description, for the purposes of explanation, numerous specific details are set forth in order to provide a thorough understanding of the present disclosure. It will be apparent, however, that the present disclosure can be practiced without these specific details. In other instances, well-known structures and devices are shown in block diagram form in order to avoid unnecessarily obscuring the present disclosure.

In the drawings, specific arrangements or orderings of schematic elements, such as those representing devices, modules, systems, instruction blocks, and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. System Overview
3. Autonomous Vehicle Architecture
4. Autonomous Vehicle Inputs
5. Autonomous Vehicle Planning
6. Autonomous Vehicle Control
7. Autonomous Vehicle Notification and Post-Action Explanation System General Overview An autonomous vehicle (AV) can maneuver to avoid an imminent collision or to maintain a predefined distance from nearby objects. In an example, an AV maneuvers to avoid an imminent collision with objects. In another example, the AV maneuvers to maintain a predefined distance from other vehicles or objects getting closer to the AV or the AV's planned path. Such maneuvers cause the AV to deviate from the planned path. The deviation can be unexpected or sudden (e.g., a sudden change in velocity or acceleration) for AV users (e.g., passengers in the vehicle or operators in a remote command center). Repeated deviations without proper notification or explanation may cause users to lose confidence in the AV system. The object(s) causing such an incident can be identified and an explanation of how the object(s) caused the deviation will be reported back to the users through a visual and/or audio message. An explanation system is implemented to provide users with explanations for the deviation from the planned path. Simulations can be performed to determine the cause(s) of the deviation of the vehicle. For example, when the vehicle slows down to avoid colliding with an animal crossing the road, a collision avoidance signal is generated. In the example, the collision avoidance signal prompts a corresponding simulation system to determine the cause of the deceleration. An explanation for the vehicle deviation (e.g., that the vehicle decelerated to avoid collision with an animal crossing the road) is broadcast to the passengers of the vehicle using audio and/or visual interfaces in the vehicle.

Some of the advantages of these techniques include promoting user trust and confidence in the AV vehicle through the explanation of autonomous vehicle deviation from the planned path. The explanation comes after an AV deviation and hence does not require user intervention. The explanation system uses data from the AV stack (e.g. planning or control circuits) but does not consume the computational resources of the AV stack, and hence will not affect the processing speed of the AV stack. The explanation system can alert a remote operator, if one exists or is available, to intervene if necessary. Backup simulators ensure the system operates when a primary simulator malfunctions. A history of deviation events and their respective explanations is saved in a log or a database to allow future examination or diagnosis.

System Overview

FIG. 1 shows an example of an AV 100 having autonomous capability.

As used herein, the term "autonomous capability" refers to a function, feature, or facility that enables a vehicle to be partially or fully operated without real-time human intervention, including without limitation fully AVs, highly AVs, and conditionally AVs.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle. A lane is sometimes identified based on lane markings. For example, a lane may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area or, e.g., natural obstructions to be avoided in an undeveloped area. A lane could also be interpreted independent of lane markings or physical features. For example, a lane could be interpreted based on an arbitrary path free of obstructions in an area that otherwise lacks features that would be interpreted as lane boundaries. In an example scenario, an AV could interpret a lane through an obstruction-free portion of a field or empty lot. In another example scenario, an AV could interpret a lane through a wide (e.g., wide enough for two or more lanes) road that does not have lane markings. In this scenario, the AV could communicate information about the lane to other AVs so that the other AVs can use the same lane information to coordinate path planning among themselves.

The term "over-the-air (OTA) client" includes any AV, or any electronic device (e.g., computer, controller, IoT device, electronic control unit (ECU)) that is embedded in, coupled to, or in communication with an AV.

The term "over-the-air (OTA) update" means any update, change, deletion or addition to software, firmware, data or configuration settings, or any combination thereof, that is delivered to an OTA client using proprietary and/or standardized wireless communications technology, including but not limited to: cellular mobile communications (e.g., 2G, 3G, 4G, 5G), radio wireless area networks (e.g., WiFi) and/or satellite Internet.

The term "edge node" means one or more edge devices coupled to a network that provide a portal for communication with AVs and can communicate with other edge nodes and a cloud based computing platform, for scheduling and delivering OTA updates to OTA clients.

The term "edge device" means a device that implements an edge node and provides a physical wireless access point (AP) into enterprise or service provider (e.g., VERIZON, AT&T) core networks. Examples of edge devices include but are not limited to: computers, controllers, transmitters, routers, routing switches, integrated access devices (IADs), multiplexers, metropolitan area network (MAN) and wide area network (WAN) access devices.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 200 described below with respect to FIG. 2.

In general, this document describes technologies applicable to any vehicles that have one or more autonomous capabilities including fully AVs, highly AVs, and conditionally AVs, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially AVs and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems can automate certain vehicle operations (e.g., steering, braking, and using maps) under certain operating conditions based on processing of sensor inputs. The technologies described in this document can benefit vehicles in any levels, ranging from fully AVs to human-operated vehicles.

AVs have advantages over vehicles that require a human driver. One advantage is safety. For example, in 2016, the United States experienced 6 million automobile accidents, 2.4 million injuries, 40,000 fatalities, and 10 million vehicles in crashes, estimated at a societal cost of $910+ billion. U.S. traffic fatalities per 100 million miles traveled have been reduced from about six to about one from 1965 to 2015, in part due to additional safety measures deployed in vehicles. For example, an additional half second of warning that a crash is about to occur is believed to mitigate 60% of front-to-rear crashes. However, passive safety features (e.g., seat belts, airbags) have likely reached their limit in improving this number. Thus, active safety measures, such as automated control of a vehicle, are the likely next step in improving these statistics. Because human drivers are believed to be responsible for a critical pre-crash event in 95% of crashes, automated driving systems are likely to achieve better safety outcomes, e.g., by reliably recognizing and avoiding critical situations better than humans; making better decisions, obeying traffic laws, and predicting future events better than humans; and reliably controlling a vehicle better than a human.

Referring to FIG. 1, an AV system 120 operates the vehicle 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 116. We use the term "operational command" to mean an executable instruction (or set of instructions) that causes a vehicle to perform an action (e.g., a driving maneuver). Operational commands can, without limitation, include instructions for a vehicle to start moving forward, stop moving forward, start moving backward, stop moving backward, accelerate, decelerate, perform a left turn, and perform a right turn. In an embodiment, computing processors 116 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the vehicle 100, such as the AV's position, linear and angular velocity and acceleration, and heading (e.g., an orientation of the leading end of vehicle 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 112 and memory 114 for storing machine instructions associated with computer processors 116 or data collected by sensors 121. In an embodiment, the data storage unit 112 is similar to the ROM 308 or storage device 310 described below in relation to FIG. 3. In an embodiment, memory 114 is similar to the main memory 306 described below. In an embodiment, the data storage unit 112 and memory 114 store historical, real-time, and/or predictive information about the environment 190. In an embodiment, the stored information includes maps, driving performance, traffic congestion updates or weather conditions. In an embodiment, data relating to the environment 190 is transmitted to the vehicle 100 via a communications channel from a remotely located database 104.

In an embodiment, the AV system 120 includes communications devices 110 for communicating measured or inferred properties of other vehicles' states and conditions, such as positions, linear and angular velocities, linear and angular accelerations, and linear and angular headings to the vehicle 100. These devices include Vehicle-to-Vehicle (V2V) and Vehicle-to-Infrastructure (V2I) communication devices and devices for wireless communications over point-to-point or ad hoc networks or both. In an embodiment, the communications devices 110 communicate across the electromagnetic spectrum (including radio and optical communications) or other media (e.g., air and acoustic media). A combination of Vehicle-to-Vehicle (V2V) and Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among AVs.

In an embodiment, the communication devices 110 include communication interfaces. For example, wired, wireless, WiMAX, Wi-Fi, Bluetooth, satellite, cellular, optical, near field, infrared, or radio interfaces. The communication interfaces transmit data from a remotely located database 104 to AV system 120. In an embodiment, the remotely located database 104 is embedded in a cloud computing environment 200 as described in FIG. 2. The communication devices 110 transmit data collected from sensors 121 or other data related to the operation of vehicle 100 to the remotely located database 104. In an embodiment, communication devices 110 transmit information that relates to teleoperations to the vehicle 100. In some embodiments, the vehicle 100 communicates with other remote (e.g., "cloud") servers 106.

In an embodiment, the remotely located database 104 also stores and transmits digital data (e.g., storing data such as road and street locations). Such data is stored on the memory 114 on the vehicle 100, or transmitted to the vehicle 100 via a communications channel from the remotely located database 104.

In an embodiment, the remotely located database 104 stores and transmits historical information about driving properties (e.g., speed and acceleration profiles) of vehicles that have previously traveled along trajectory 198 at similar times of day. In one implementation, such data can be stored on the memory 114 on the vehicle 100, or transmitted to the vehicle 100 via a communications channel from the remotely located database 104.

Computer processors 116 located on the vehicle 100 algorithmically generate control actions based on both real-time sensor data and prior information, allowing the AV system 120 to execute its autonomous driving capabilities.

In an embodiment, the AV system 120 includes computer peripherals 102 coupled to computer processors 116 for providing information and alerts to, and receiving input from, a user (e.g., an occupant or a remote user) of the vehicle 100. In an embodiment, peripherals 102 are similar to the display 312, input device 314, and cursor controller 316 discussed below in reference to FIG. 3. The coupling is wireless or wired. Any two or more of the interface devices can be integrated into a single device.

In an embodiment, the AV system 120 receives and enforces a privacy level of a passenger, e.g., specified by the passenger or stored in a profile associated with the passenger. The privacy level of the passenger determines how particular information associated with the passenger (e.g., passenger comfort data, biometric data, etc.) is permitted to be used, stored in the passenger profile, and/or stored on the cloud server 106 and associated with the passenger profile. In an embodiment, the privacy level specifies particular information associated with a passenger that is deleted once the ride is completed. In an embodiment, the privacy level specifies particular information associated with a passenger and identifies one or more entities that are authorized to access the information. Examples of specified entities that are authorized to access information can include other AVs, third party AV systems, or any entity that could potentially access the information.

A privacy level of a passenger can be specified at one or more levels of granularity. In an embodiment, a privacy level identifies specific information to be stored or shared. In an embodiment, the privacy level applies to all the information associated with the passenger such that the passenger can specify that none of her personal information is stored or shared. Specification of the entities that are permitted to access particular information can also be specified at various levels of granularity. Various sets of entities that are permitted to access particular information can include, for example, other AVs, cloud servers 106, specific third party AV systems, etc.

In an embodiment, the AV system 120 or the cloud server 106 determines if certain information associated with a passenger can be accessed by the AV 100 or another entity. For example, a third-party AV system that attempts to access passenger input related to a particular spatiotemporal location must obtain authorization, e.g., from the AV system 120 or the cloud server 106, to access the information associated with the passenger. For example, the AV system 120 uses the passenger's specified privacy level to determine whether the passenger input related to the spatiotemporal location can be presented to the third-party AV system, the AV 100, or to another AV. This enables the passenger's privacy level to specify which other entities are allowed to receive data about the passenger's actions or other data associated with the passenger.

Figure 2:
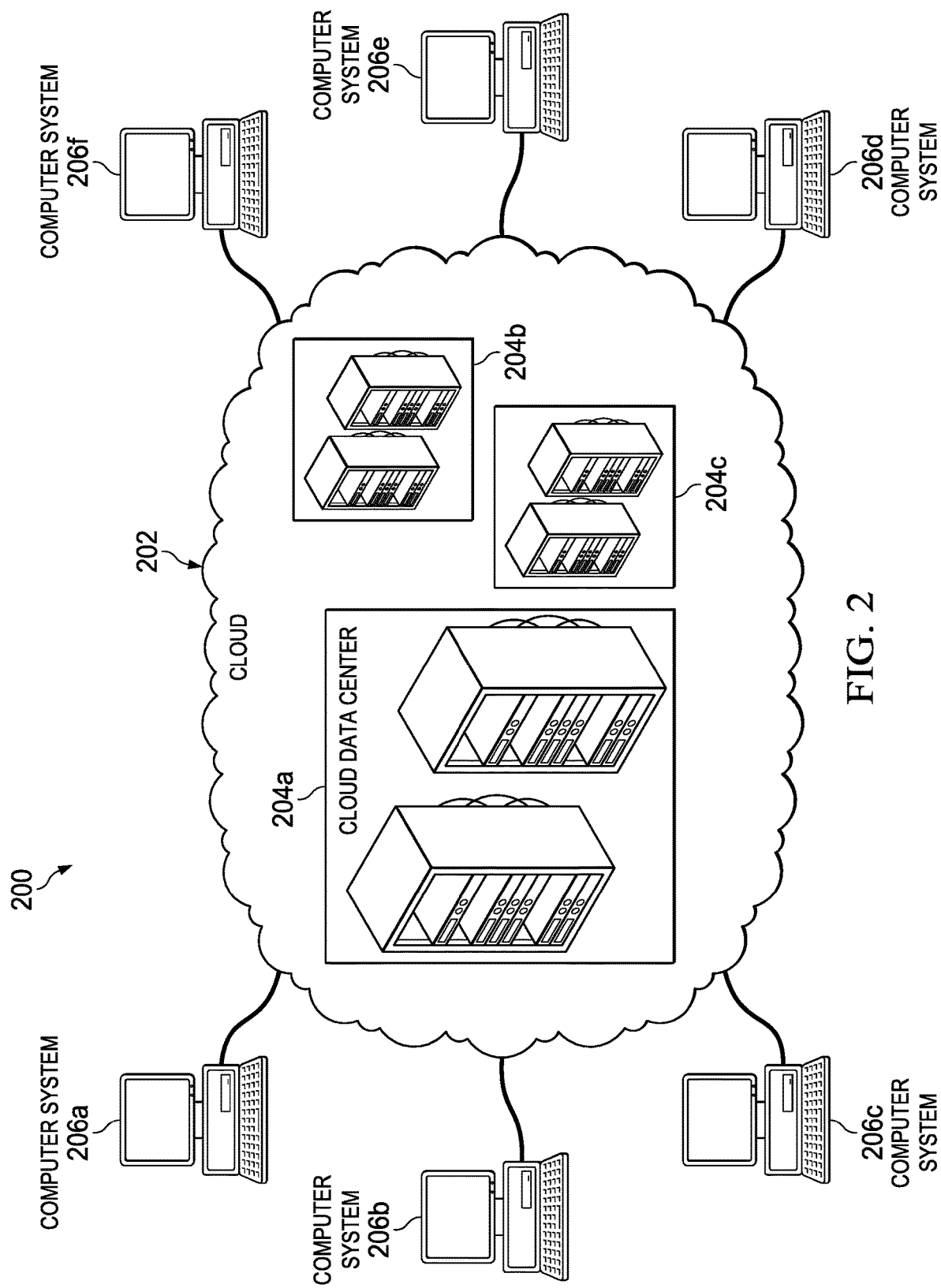
FIG. 2 shows an example "cloud" computing environment.

FIG. 2 shows an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementations, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, AVs (including, cars, drones, shuttles, trains, buses, etc.) and consumer electronics. In an embodiment, the computing systems 206a-f are implemented in or as a part of other systems.

Figure 3:
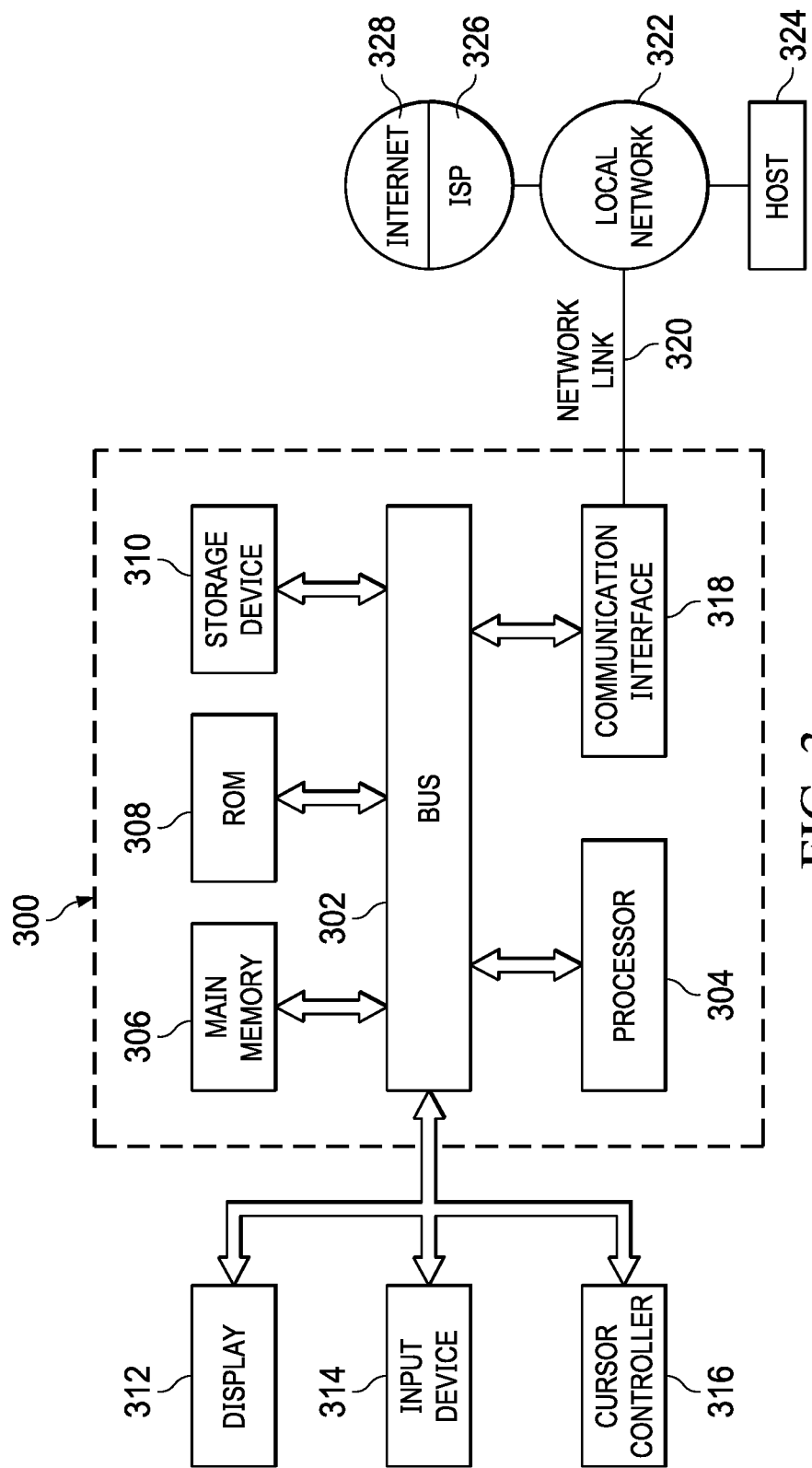
FIG. 3 shows a computer system.

FIG. 3 shows a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or can include one or more general purpose hardware processors programmed to perform the techniques pursuant to program instructions in firmware, memory, other storage, or a combination. Such special-purpose computing devices can also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a processor 304 coupled with a bus 302 for processing information. The processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and sends the instructions over a telephone line using a modem. A modem local to the computer system 300 receives the data on the telephone line and uses an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 can optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above in accordance with FIG. 2.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
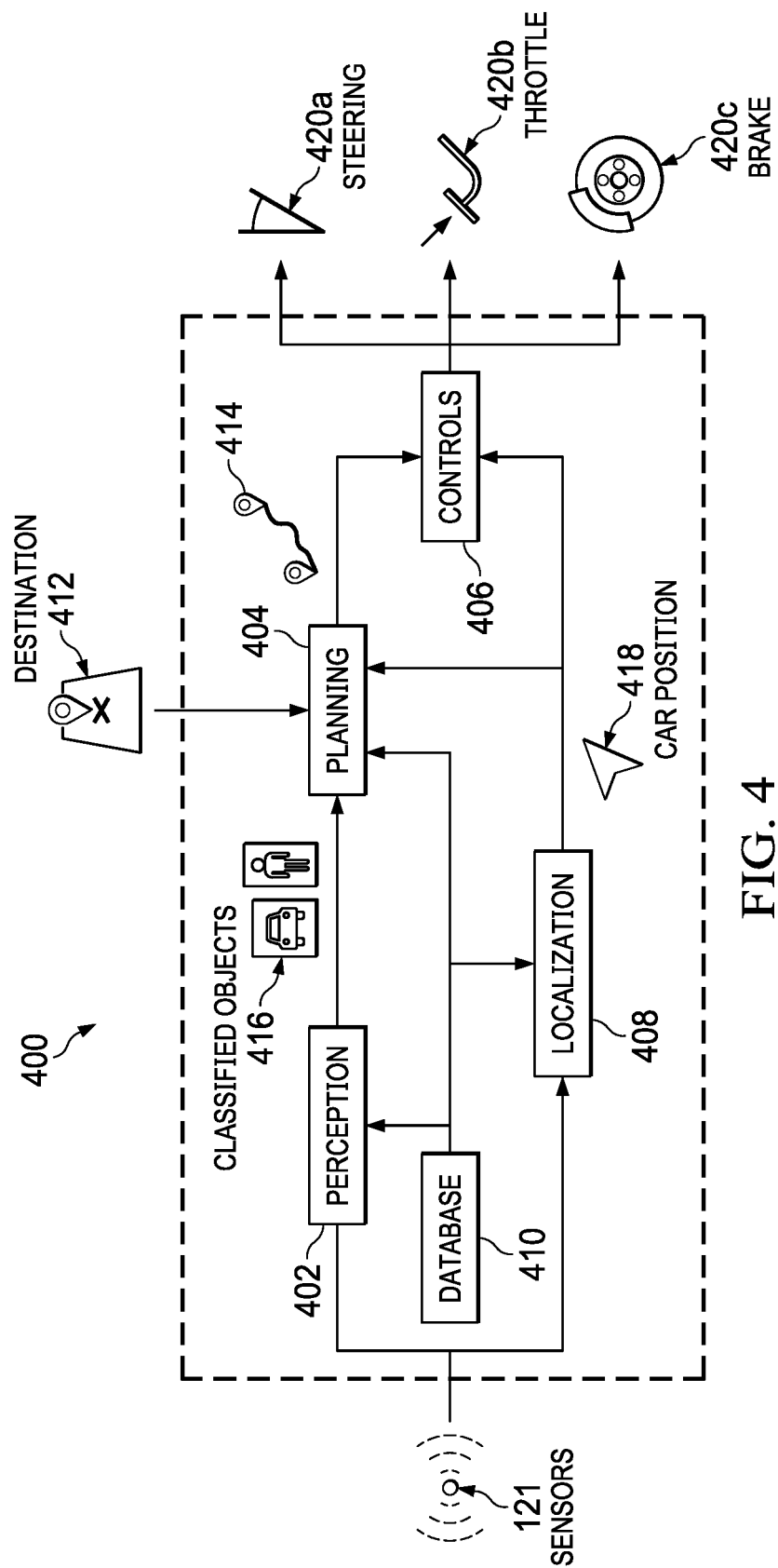
FIG. 4 shows an example architecture for an AV.

FIG. 4 shows an example architecture 400 for an AV (e.g., the vehicle 100 shown in FIG. 1). The architecture 400 includes a perception system 402 (sometimes referred to as a perception circuit), a planning system 404 (sometimes referred to as a planning circuit), a control system 406 (sometimes referred to as a control circuit), a localization system 408 (sometimes referred to as a localization circuit), and a database system 410 (sometimes referred to as a database circuit). Each system plays a role in the operation of the vehicle 100. Together, the systems 402, 404, 406, 408, and 410 can be part of the AV system 120 shown in FIG. 1. In some embodiments, any of the systems 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things). Each of the systems 402, 404, 406, 408, and 410 is sometimes referred to as a processing circuit (e.g., computer hardware, computer software, or a combination of the two). A combination of any or all of the systems 402, 404, 406, 408, and 410 is also an example of a processing circuit.

In use, the planning system 404 receives data representing a destination 412 and determines data representing a trajectory 414 (sometimes referred to as a route) that can be traveled by the vehicle 100 to reach (e.g., arrive at) the destination 412. In order for the planning system 404 to determine the data representing the trajectory 414, the planning system 404 receives data from the perception system 402, the localization system 408, and the database system 410.

The perception system 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning system 404.

The planning system 404 also receives data representing the AV position 418 from the localization system 408. The localization system 408 determines the AV position by using data from the sensors 121 and data from the database system 410 (e.g., a geographic data) to calculate a position. For example, the localization system 408 uses data from a GNSS (Global Navigation Satellite System) sensor and geographic data to calculate a longitude and latitude of the AV. In an embodiment, data used by the localization system 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types. In an embodiment, the high-precision maps are constructed by adding data through automatic or manual annotation to low-precision maps.

The control system 406 receives the data representing the trajectory 414 and the data representing the AV position 418 and operates the control functions 420a-c (e.g., steering, throttling, braking, ignition) of the AV in a manner that will cause the vehicle 100 to travel the trajectory 414 to the destination 412. For example, if the trajectory 414 includes a left turn, the control system 406 will operate the control functions 420a-c in a manner such that the steering angle of the steering function will cause the vehicle 100 to turn left and the throttling and braking will cause the vehicle 100 to pause and wait for passing pedestrians or vehicles before the turn is made.

Autonomous Vehicle Inputs

Figure 5:
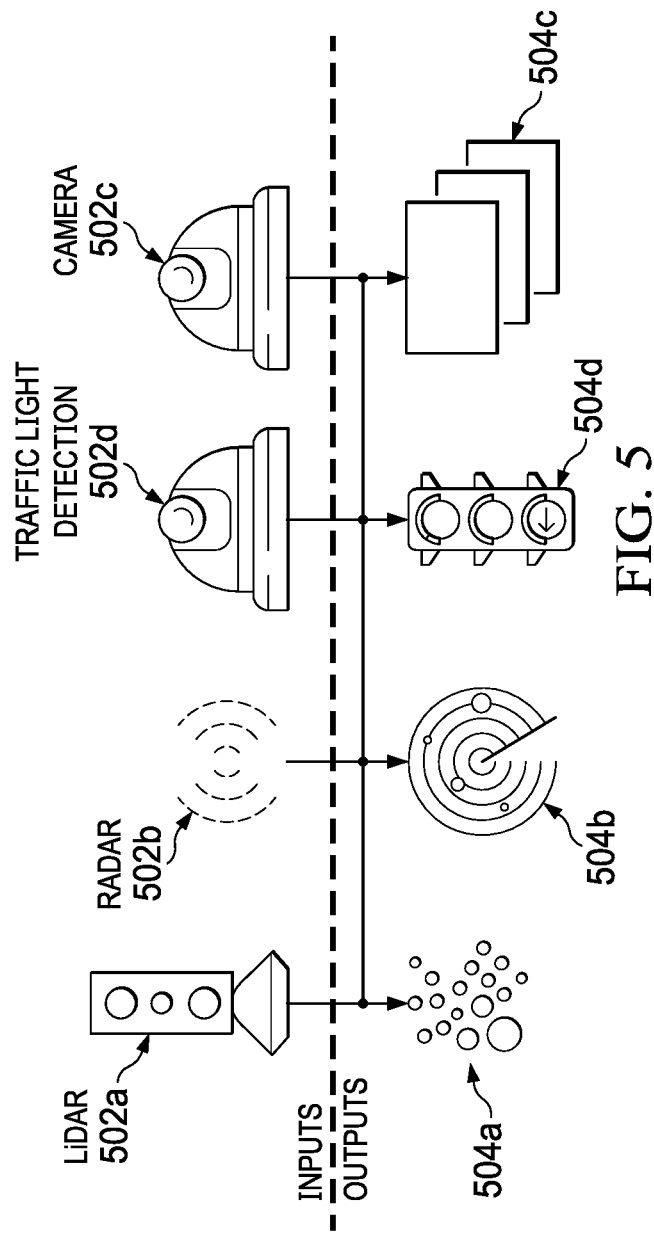
FIG. 5 shows an example of inputs and outputs that can be used by a perception system.

FIG. 5 shows an example of inputs 502a-d (e.g., sensors 121 shown in FIG. 1) and outputs 504a-d (e.g., sensor data) that is used by the perception system 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as point clouds) that are used to construct a representation of the environment 190 as shown in FIG. 1.

Another input 502b is a RADAR system. RADAR is a technology that uses radio waves to obtain data about nearby physical objects. RADARs can obtain data about objects not within the line of sight of a LiDAR system. A RADAR system produces RADAR data as output 504b. For example, RADAR data are one or more radio frequency electromagnetic signals that are used to construct a representation of the environment 190 shown in FIG. 1.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In some embodiments, the camera system is configured to "see" objects far, e.g., up to a kilometer or more ahead of the AV. Accordingly, in some embodiments, the camera system has features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the vehicle 100 has access to all relevant navigation information provided by these objects. For example, the viewing angle of the TLD system is about 120 degrees or more.

In some embodiments, outputs 504a-d are combined using a sensor fusion technique. Thus, either the individual outputs 504a-d are provided to other systems of the vehicle 100 (e.g., provided to a planning system 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Path Planning

Figure 6:
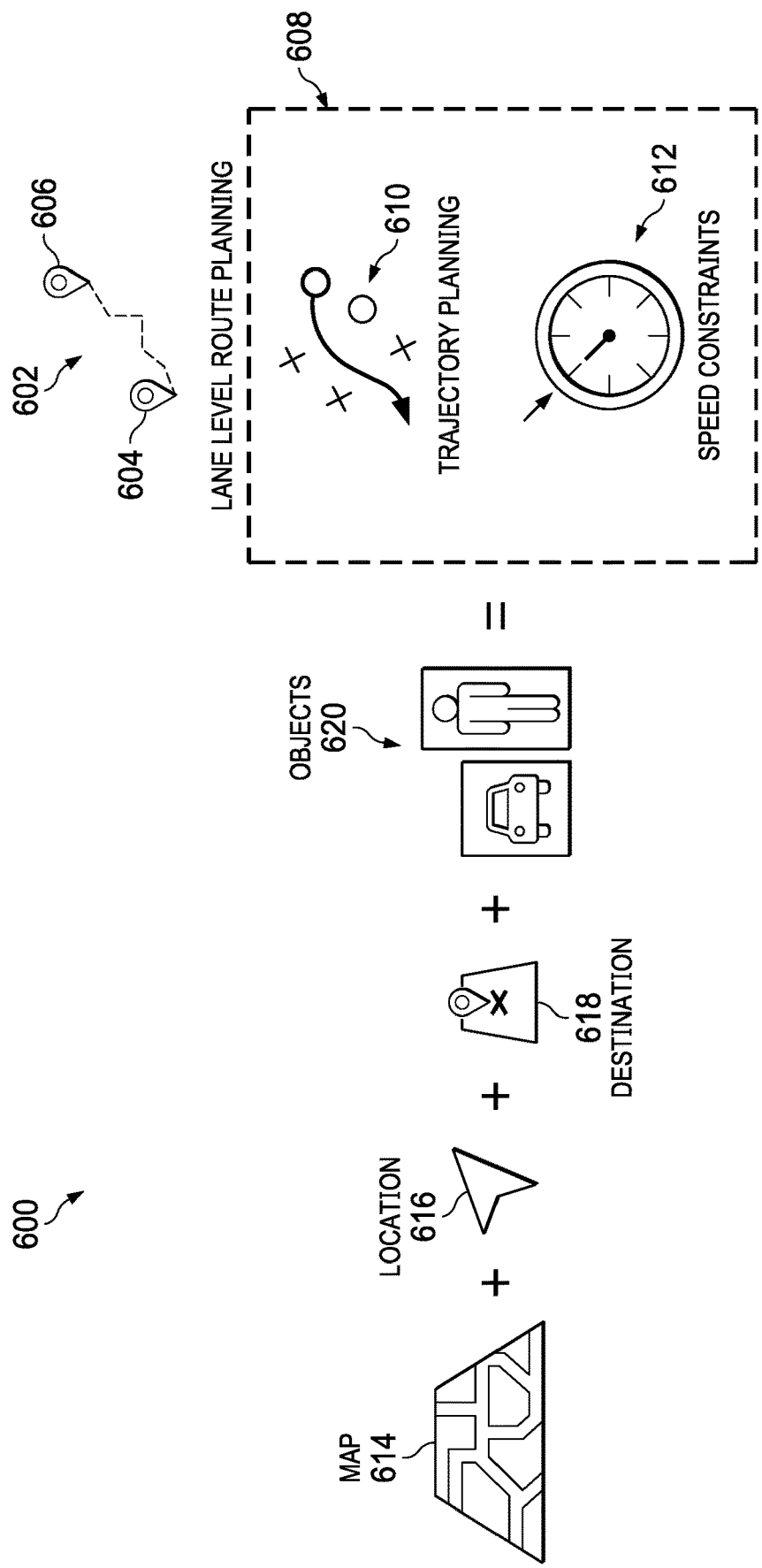
FIG. 6 shows a block diagram of the relationships between inputs and outputs of a planning system.

FIG. 6 shows a block diagram 600 of the relationships between inputs and outputs of a planning system 404 (e.g., as shown in FIG. 4). In general, the output of a planning system 404 is a route 602 from a start point 604 (e.g., source location or initial location), and an end point 606 (e.g., destination or final location). The route 602 is typically defined by one or more segments. For example, a segment is a distance to be traveled over at least a portion of a street, road, highway, driveway, or other physical area appropriate for automobile travel. In some examples, e.g., if the vehicle 100 is an off-road capable vehicle such as a four-wheel-drive (4WD) or all-wheel-drive (AWD) car, SUV, pick-up truck, or the like, the route 602 includes "off-road" segments such as unpaved paths or open fields.

In addition to the route 602, a planning system also outputs lane-level route planning data 608. The lane-level route planning data 608 is used to traverse segments of the route 602 based on conditions of the segment at a particular time. For example, if the route 602 includes a multi-lane highway, the lane-level route planning data 608 includes trajectory planning data 610 that the vehicle 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 608 includes speed constraints 612 specific to a segment of the route 602. For example, if the segment includes pedestrians or unexpected traffic, the speed constraints 612 may limit the vehicle 100 to a travel speed slower than an expected speed, e.g., a speed based on speed limit data for the segment.

In an embodiment, the inputs to the planning system 404 includes database data 614 (e.g., from the database system 410 shown in FIG. 4), current location data 616 (e.g., the AV position 418 shown in FIG. 4), destination data 618 (e.g., for the destination 412 shown in FIG. 4), and object data 620 (e.g., the classified objects 416 as perceived by the perception system 402 as shown in FIG. 4). In some embodiments, the database data 614 includes rules used in planning. Rules are specified using a formal language, e.g., using Boolean logic. In any given situation encountered by the vehicle 100, at least some of the rules will apply to the situation. A rule applies to a given situation if the rule has conditions that are met based on information available to the vehicle 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 7:
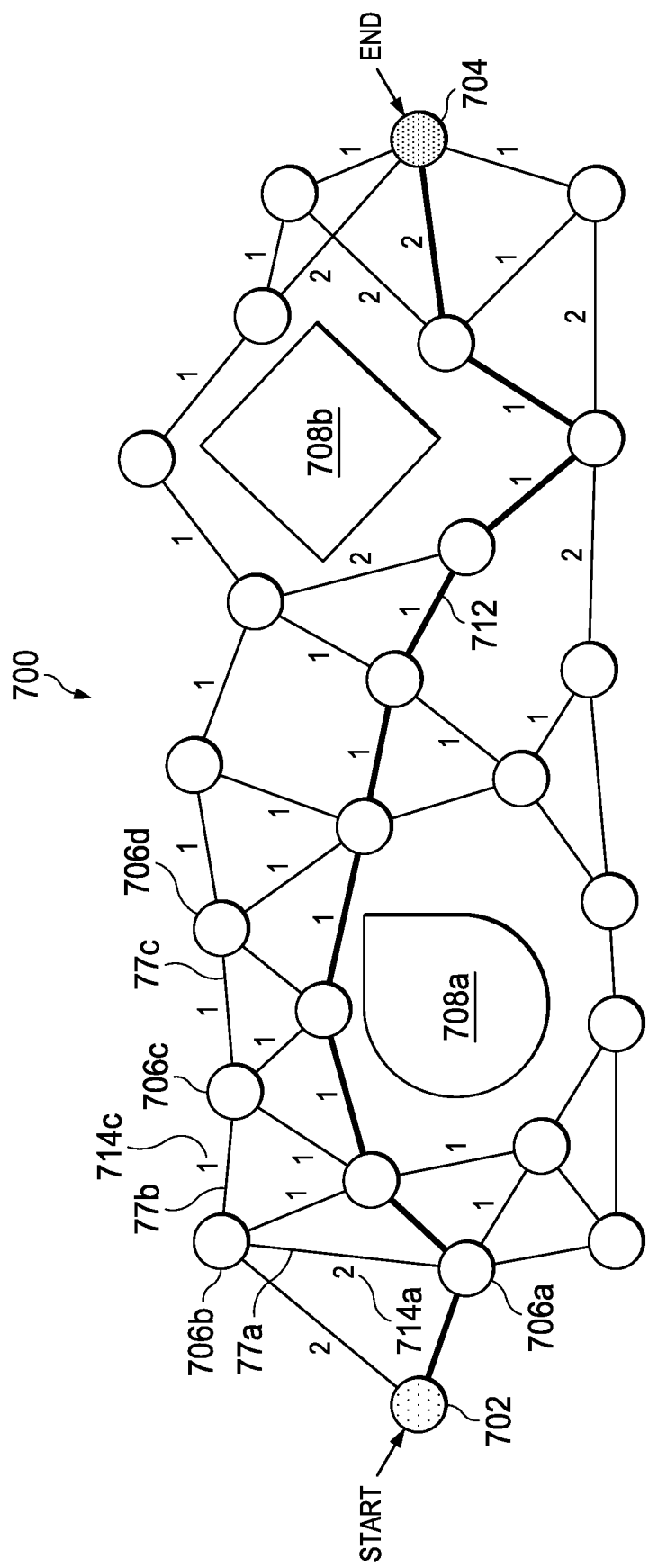
FIG. 7 shows a directed graph used in path planning.

FIG. 7 shows a directed graph 700 used in path planning, e.g., by the planning system 404 (FIG. 4). In general, a directed graph 700 like the one shown in FIG. 7 is used to determine a path between any start point 702 and end point 704. In real-world terms, the distance separating the start point 702 and end point 704 may be relatively large (e.g., in two different metropolitan areas) or may be relatively small (e.g., two intersections abutting a city block or two lanes of a multi-lane road).

In an embodiment, the directed graph 700 has nodes 706a-d representing different locations between the start point 702 and the end point 704 that could be occupied by a vehicle 100. In some examples, e.g., when the start point 702 and end point 704 represent different metropolitan areas, the nodes 706a-d represent segments of roads. In some examples, e.g., when the start point 702 and the end point 704 represent different locations on the same road, the nodes 706a-d represent different positions on that road. In this way, the directed graph 700 includes information at varying levels of granularity. In an embodiment, a directed graph having high granularity is also a subgraph of another directed graph having a larger scale. For example, a directed graph in which the start point 702 and the end point 704 are far away (e.g., many miles apart) has most of its information at a low granularity and is based on stored data, but also includes some high granularity information for the portion of the graph that represents physical locations in the field of view of the vehicle 100.

The nodes 706a-d are distinct from objects 708a-b which cannot overlap with a node. In an embodiment, when granularity is low, the objects 708a-b represent regions that cannot be traversed by automobile, e.g., areas that have no streets or roads. When granularity is high, the objects 708a-b represent physical objects in the field of view of the vehicle 100, e.g., other automobiles, pedestrians, or other entities with which the vehicle 100 cannot share physical space. In an embodiment, some or all of the objects 708a-b are a static objects (e.g., an object that does not change position such as a street lamp or utility pole) or dynamic objects (e.g., an object that is capable of changing position such as a pedestrian or other car).

The nodes 706a-d are connected by edges 710a-c. If two nodes 706a-b are connected by an edge 710a, it is possible for a vehicle 100 to travel between one node 706a and the other node 706b, e.g., without having to travel to an intermediate node before arriving at the other node 706b. (When we refer to a vehicle 100 traveling between nodes, we mean that the vehicle 100 travels between the two physical positions represented by the respective nodes). The edges 710a-c are often bidirectional, in the sense that a vehicle 100 travels from a first node to a second node, or from the second node to the first node. In an embodiment, edges 710a-c are unidirectional, in the sense that a vehicle 100 can travel from a first node to a second node, however the vehicle 100 cannot travel from the second node to the first node. Edges 710a-c are unidirectional when they represent, for example, one-way streets, individual lanes of a street, road, or highway, or other features that can only be traversed in one direction due to legal or physical constraints.

In an embodiment, the planning system 404 uses the directed graph 700 to identify a path 712 made up of nodes and edges between the start point 702 and end point 704.

An edge 710a-c has an associated cost 714a-b. The cost 714a-b is a value that represents the resources that will be expended if the vehicle 100 chooses that edge. A typical resource is time. For example, if one edge 710a represents a physical distance that is twice that as another edge 710b, then the associated cost 714a of the first edge 710a may be twice the associated cost 714b of the second edge 710b. Other factors that affect time include expected traffic, number of intersections, speed limit, etc. Another typical resource is fuel economy. Two edges 710a-b may represent the same physical distance, but one edge 710a may require more fuel than another edge 710b, e.g., because of road conditions, expected weather, etc.

When the planning system 404 identifies a path 712 between the start point 702 and end point 704, the planning system 404 typically chooses a path optimized for cost, e.g., the path that has the least total cost when the individual costs of the edges are added together.

Autonomous Vehicle Control

Figure 8:
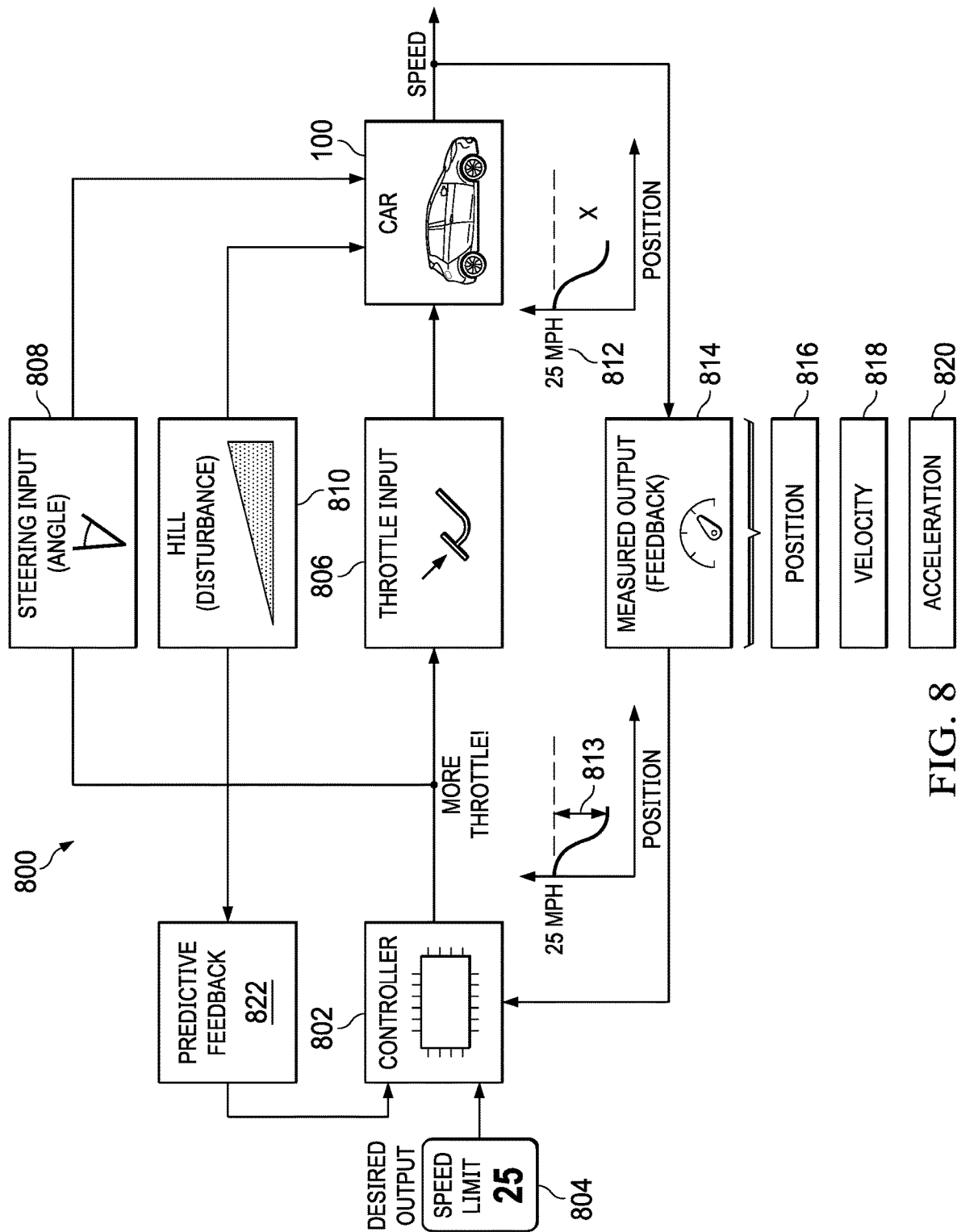
FIG. 8 shows a block diagram of the inputs and outputs of a control system.

FIG. 8 shows a block diagram 800 of the inputs and outputs of a control system 406 (e.g., as shown in FIG. 4). A control system operates in accordance with a controller 802 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 308, and storage device 310, and instructions stored in memory that carry out operations of the controller 802 when the instructions are executed (e.g., by the one or more processors).

In an embodiment, the controller 802 receives data representing a desired output 804. The desired output 804 typically includes a velocity, e.g., a speed and a heading. The desired output 804 can be based on, for example, data received from a planning system 404 (e.g., as shown in FIG. 4). In accordance with the desired output 804, the controller 802 produces data usable as a throttle input 806 and a steering input 808. The throttle input 806 represents the magnitude in which to engage the throttle (e.g., acceleration control) of a vehicle 100, e.g., by engaging the steering pedal, or engaging another throttle control, to achieve the desired output 804. In some examples, the throttle input 806 also includes data usable to engage the brake (e.g., deceleration control) of the vehicle 100. The steering input 808 represents a steering angle, e.g., the angle at which the steering control (e.g., steering wheel, steering angle actuator, or other functionality for controlling steering angle) of the AV should be positioned to achieve the desired output 804.

In an embodiment, the controller 802 receives feedback that is used in adjusting the inputs provided to the throttle and steering. For example, if the vehicle 100 encounters a disturbance 810, such as a hill, the measured speed 812 of the vehicle 100 is lowered below the desired output speed. In an embodiment, any measured output 814 is provided to the controller 802 so that the necessary adjustments are performed, e.g., based on the differential 813 between the measured speed and desired output. The measured output 814 includes a measured position 816, a measured velocity 818 (including speed and heading), a measured acceleration 820, and other outputs measurable by sensors of the vehicle 100.

In an embodiment, information about the disturbance 810 is detected in advance, e.g., by a sensor such as a camera or LiDAR sensor, and provided to a predictive feedback system 822. The predictive feedback system 822 then provides information to the controller 802 that the controller 802 can use to adjust accordingly. For example, if the sensors of the vehicle 100 detect ("see") a hill, this information can be used by the controller 802 to prepare to engage the throttle at the appropriate time to avoid significant deceleration.

Figure 9:
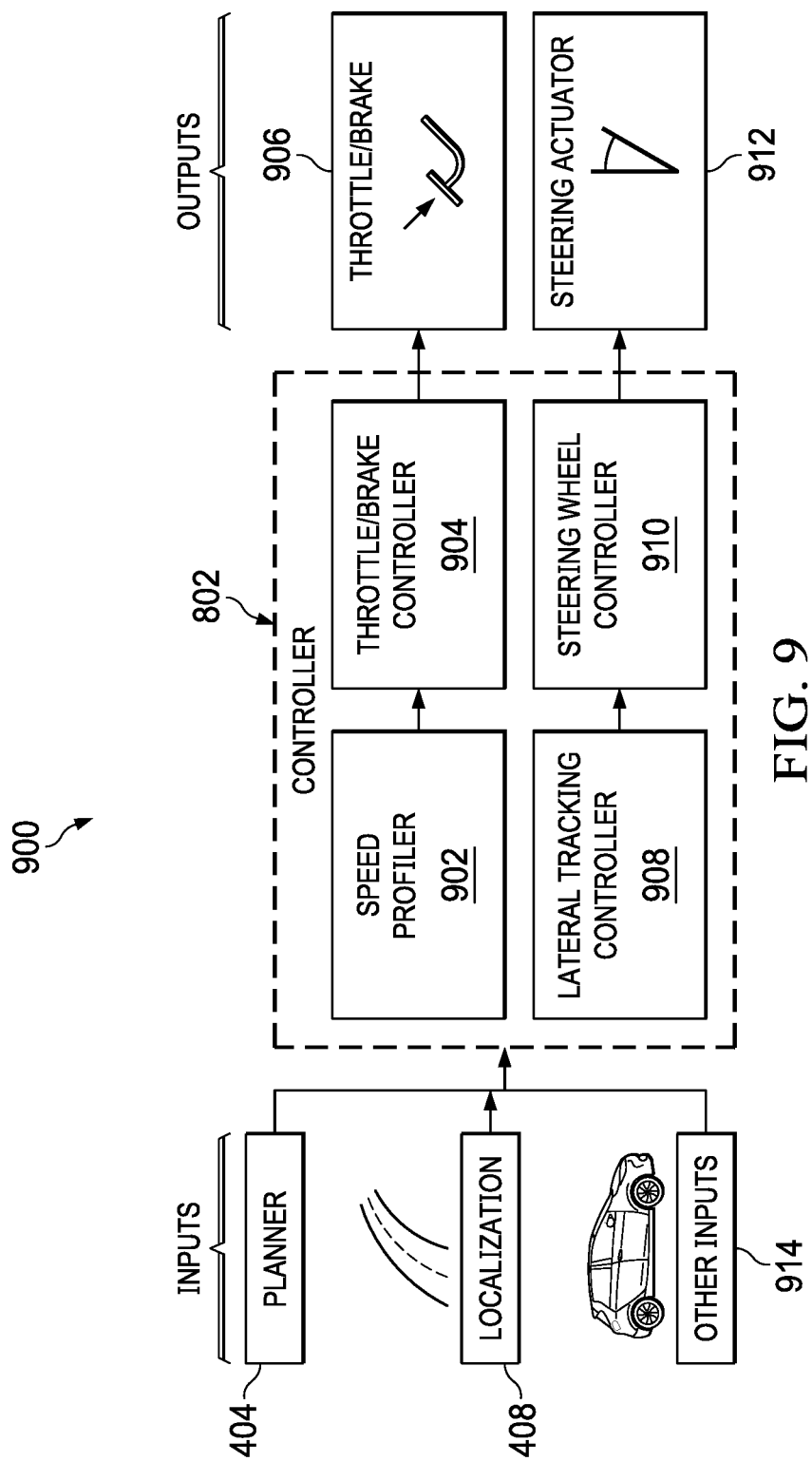
FIG. 9 shows a block diagram of the inputs, outputs, and components of a controller.

FIG. 9 shows a block diagram 900 of the inputs, outputs, and components of the controller 802. The controller 802 has a speed profiler 902 which affects the operation of a throttle/brake controller 904. For example, the speed profiler 902 instructs the throttle/brake controller 904 to engage acceleration or engage deceleration using the throttle/brake 906 depending on, e.g., feedback received by the controller 802 and processed by the speed profiler 902.

The controller 802 also has a lateral tracking controller 908 which affects the operation of a steering controller 910. For example, the lateral tracking controller 908 instructs the steering controller 910 to adjust the position of the steering angle actuator 912 depending on, e.g., feedback received by the controller 802 and processed by the lateral tracking controller 908.

The controller 802 receives several inputs used to determine how to control the throttle/brake 906 and steering angle actuator 912. A planning system 404 provides information used by the controller 802, for example, to choose a heading when the vehicle 100 begins operation and to determine which road segment to traverse when the vehicle 100 reaches an intersection. A localization system 408 provides information to the controller 802 describing the current location of the vehicle 100, for example, so that the controller 802 can determine if the vehicle 100 is at a location expected based on the manner in which the throttle/brake 906 and steering angle actuator 912 are being controlled. In an embodiment, the controller 802 receives information from other inputs 914, e.g., information received from databases, computer networks, etc.

Autonomous Vehicle Notification and Post-Action Explanation System

Figure 10:
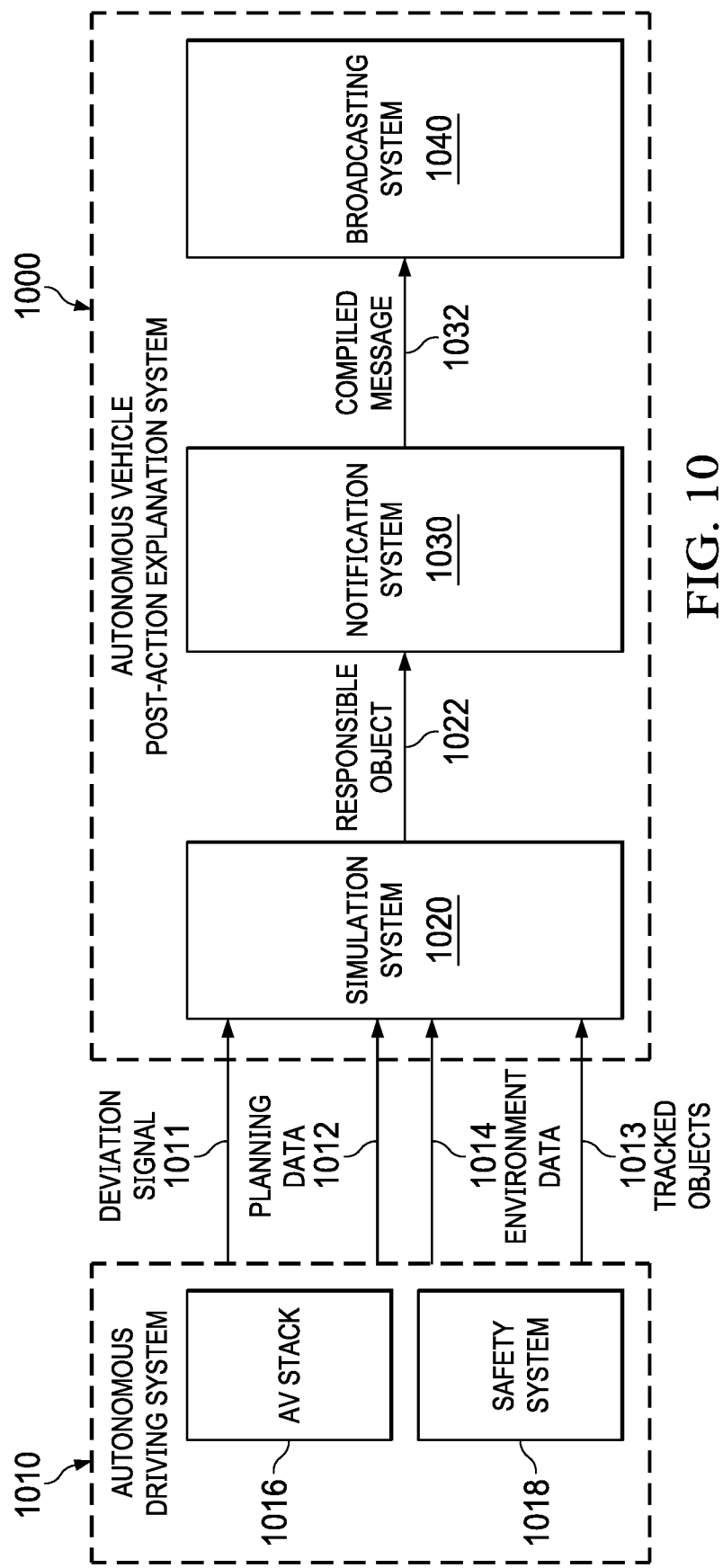
FIG. 10 shows a block diagram of an example autonomous vehicle notification and post-action explanation system.

FIG. 10 shows a block diagram of an example autonomous vehicle notification and post-action explanation system 1000. In an embodiment, the autonomous vehicle notification and post-action explanation system 1000 is a part of a processor 304 shown in FIG. 3. In an embodiment, the autonomous vehicle notification and post-action explanation system 1000 is a part of a processor in the cloud 202 shown in FIG. 2. Generally, the autonomous vehicle notification and post-action explanation system 1000 identifies at least one cause of a vehicle's deviation from a planned path. Generally, a deviation can be any unexpected motion or behavior of a vehicle. In an example, the cause of the vehicle's deviation from the planned path is an object (e.g., natural obstructions 191, vehicles 193, pedestrians 192, cyclists, and other obstacles). The cause of the deviation is reported to the users in the form of visual or audible notification.

The autonomous vehicle post-action explanation system 1000 takes as inputs deviation signal 1011, planning data 1012, tracked objects 1013, and environment data 1014. Generally, the deviation signal 1011 is a signal that indicates the vehicle has deviated from a planned path. The deviation signal 1011 can be generated after the vehicle deviated from a planned path. An example deviation signal 1011 is a collision avoidance signal generated by a collision avoidance subsystem of an AV stack 1016. Another example deviation signal 1011 is a collision avoidance signal generated by a safety system 1018. An additional example deviation signal 1011 is a drifting signal generated by a drifting subsystem of an AV stack 1016.

A collision avoidance subsystem is a subsystem of the AV stack 1016 dedicated to perform vehicle maneuvers to avoid colliding with an object or obstacle in the vicinity of the vehicle. In an embodiment, the collision avoidance subsystem is a part of the control circuit 406. An example collision avoidance signal generated by the collision avoidance subsystem or the safety system 1018 is to decelerate to avoid colliding with a pedestrian who suddenly appears.

A drifting subsystem is a subsystem of the AV stack 1016 to steer the vehicle to maintain at least a predefined distance (e.g., 1 meter) from a nearby object (e.g., a truck), even if there is no current or future risk of colliding with the nearby object. In an embodiment, the predefined distance is lateral from the vehicle (e.g., from one side of the vehicle) to the nearby object. In an embodiment, the drifting subsystem is a part of the planning system 404. In an example, the drifting subsystem steers the vehicle from the center of a lane to the left side of the lane if a large truck comes to occupy the lane to the right. In this example, the drifting signal generated by the drifting subsystem is to steer the vehicle to the left to maintain a lateral distance from the large truck. In an embodiment, a drifting signal steers the vehicle to perform a lane change to maintain the predefined distance from the nearby object. In an embodiment, the drifting signal steers the vehicle to return to a lane previously traveled by the vehicle after the vehicle performs a lane change to maintain the predefined distance from the nearby object.

Generally, the planning data 1012 represents data that is associated with instructions for navigating a vehicle from a first point toward a second point. An example set of the planning data 1012 is the data used and/or generated by the planning circuit 404 and/or the control circuit 406 of an AV 100. In examples, tracked objects 1013 are objects in the environment that have been detected and are monitored by the autonomous driving system 101, AV stack 1018, safety system 1018, or any combinations thereof. For example, the tracked objects are determined by a perception system (e.g., perception system 402 of FIG. 4), and are labeled according to their respective classification The environment data 1014 represents data associated with the surrounding environment of a vehicle. An example set of the environment data 1014 includes semantic drivable surfaces and/or labeled objects generated based on sensor data obtained from on-vehicle sensors. In an embodiment, the environment data 1014 is generated by recognizing and labeling objects and/or surfaces in sensor data, such as outputs 504a-d shown in FIG. 5. In an embodiment, the recognizing and labeling uses at least one neural network, such as VoxNet, PointNet, SegNet, YOLO and/or the like.

Figure 11:
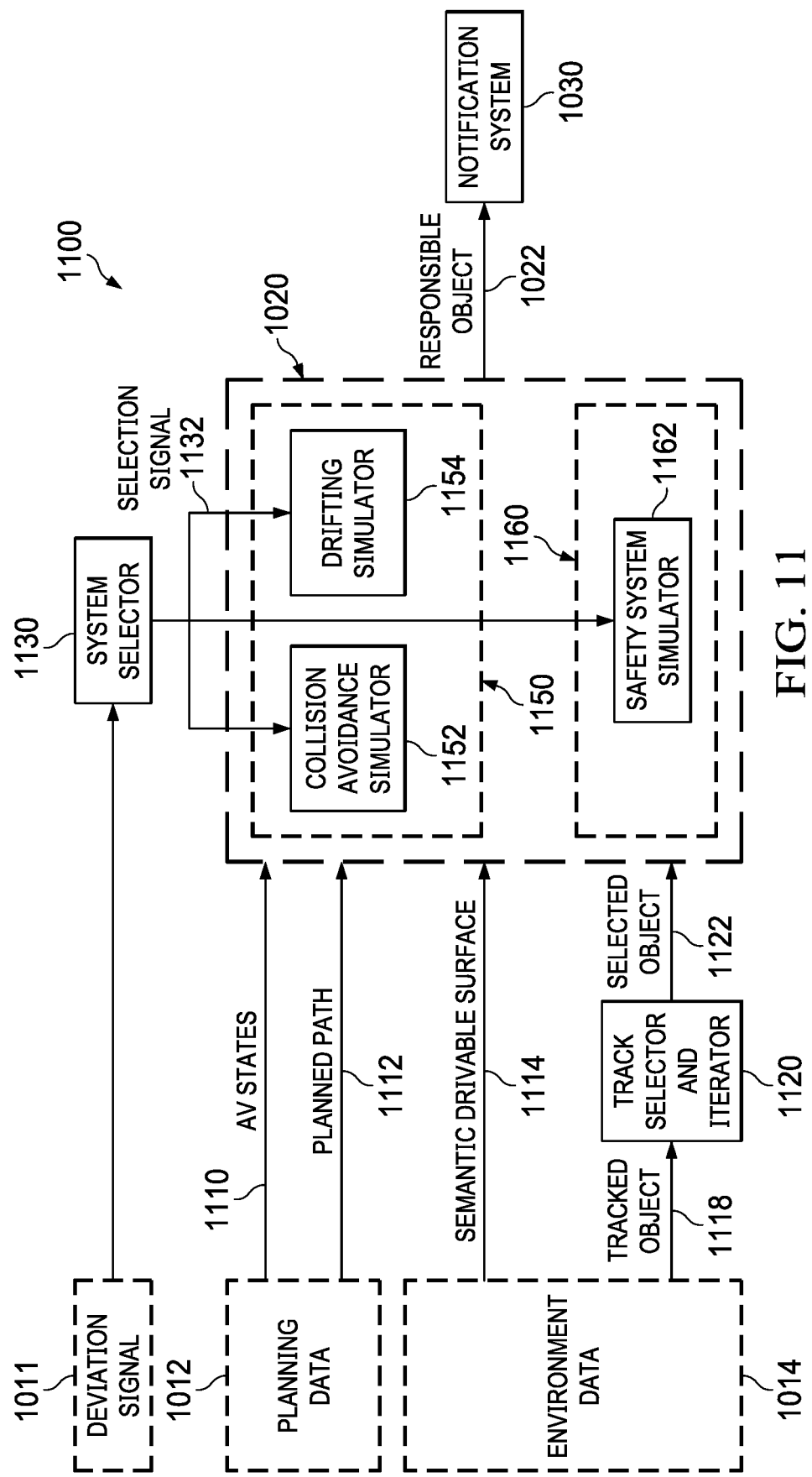
FIG. 11 shows a block diagram of the inputs, outputs, and components of an example simulation system used in an autonomous vehicle notification and post-action explanation system.

More details about the simulation based on the deviation signal 1011, planning data 1012, tracked objects 1013, environment data 1014 and/or their components are described in accordance with FIG. 11.

In an embodiment, the deviation signal 1011, the planning data 1012, tracked objects 1013, and the environment data 1014 are generated by an autonomous driving system 1010. In an embodiment, the autonomous driving system 1010 includes an AV stack 1016 and a safety system 1018. In an embodiment, the autonomous driving system 1010 is a part of the AV system 120 shown in FIG. 1. In an embodiment, the autonomous driving system 1010 includes the perception system 402 and/or the localization system 408 shown in FIG. 4. In an embodiment, the AV stack 1016 includes the planning circuit 404 and/or the control circuit 406 shown in FIG. 4.

In an embodiment, the safety system 1018 is one or more auxiliary systems at least partially independent of the AV stack 1016 to ensure the safety of autonomous driving system 1010. In such an embodiment, the safety system 1018 is a sub-system that monitors and reacts to objects in proximity of the AV, which operates independently of planning circuit 404. In an embodiment, the safety system 1018 directly applies base-level control commands (e.g., braking, turning and/or the like) on the vehicle. The safety system 1018 can be a standalone system that runs separately from and independently of the AV stack. An example safety system is the automatic emergency braking (AEB) system. The AEB system uses sensors to detect obstacles ahead and assess whether a collision is likely. If a collision is likely then the AEB system will apply the brakes. In an embodiment, the safety system 1018 includes standalone sensors. In an embodiment, the safety system 1018 uses sensors of the autonomous vehicle, such as a LiDAR 502*a*, a RADAR 502*b* or a camera 502*c* as shown in FIG. 5.

In an embodiment, the planning data 1012 is generated using the AV stack 1016, while the deviation signal 1011 is generated from either the AV stack 1016 or the safety system 1018. In an embodiment, the planning data 1012 is generated at least partially using the planning circuit 404 as shown in FIG. 4.

In an embodiment, the environment data 1014 represents an environment in which the vehicle operates. In an embodiment, the environment data 1014 is generated by the autonomous driving system 1010. In such an embodiment, the environment data 1014 is generated at least partially by the perception system 402.

The components, in some cases after processing, of deviation signal 1011, the planning data 1012, tracked objects 1013, and the environment data 1014 are provided as inputs to a simulation system 1020. The simulation system 1020 determines the responsible object(s) 1022 causing the deviation. More details regarding the components of deviation signal 1011, the planning data 1012 and the environment data 1014, the simulation system 1020 and determining the responsible object 1022 is described below in reference to FIG. 11.

Once the responsible object 1022 causing the deviation is determined, the responsible object 1022 is provided as input to a notification system 1030. The notification system 1030 takes the responsible object 1022 and searches through a recent history of sensor data for the responsible object 1022. For example, if the responsible object 1022 is a squirrel crossing a travel lane traveled by the vehicle, the notification system 1030 searches through a recent history of camera images (e.g., images captured within the past 10 seconds) for the squirrel, and generates a set of images or a video showing the squirrel. In an embodiment, the sensor data is unprocessed (e.g., not labeled), and the notification system 1030 detects and recognizes in the sensor data the responsible object 1022 using a neural network, such as YOLO or PointNet. In an embodiment, processed (e.g., labeled) sensor data is available from an object detection neural network that is configured to receive sensor data and process the sensor data to detect at least one object (e.g., natural obstructions 191, vehicles 193, and pedestrians 192, of FIG. 1; cyclists, and other obstacles) in the 3D space surrounding the sensor. In an embodiment, an object detection neural network is a feed-forward convolutional neural network that, given the outputs 504*a-d* (e.g., sensor data), generates a set of bounding boxes for potential objects in the 3D space and confidence scores for the presence of object class instances (e.g., cars, pedestrians, or bikes) within the bounding boxes. In an embodiment, the object detection network is a semantic segmentation neural network, such as SegNet. In an example, the SegNet takes as input a set of images, predicts the class of each pixel in the images and outputs semantic segmentation data (e.g., a label) for each pixel in the image.

The notification system 1030 searches for matching labels on the processed sensor data. For example, if semantic segmentation masks are available (e.g., stored in a database) for images captured by cameras and the responsible object 1022 is labeled as a squirrel, the notification system 1030 searches the stored segmentation masks for regions labeled as squirrel and then locates the corresponding images captured by the cameras showing the squirrel. In an embodiment, the responsible object 1022 causing the deviation is static, such as a fallen tree or a parked car. In an embodiment, the responsible object 1022 causing the deviation is dynamic, such as a squirrel or a pedestrian.

The notification system 1030 generates compiled message 1032. In an embodiment, the compiled message 1032 includes a warning. In an embodiment, the compiled message 1032 identifies the responsible object 1022 causing the deviation. In an embodiment, the compiled message 1032 is an audio message. In an embodiment, the compiled message 1032 is a video message. In an embodiment, the compiled message 1032 includes a distance measurement between the vehicle and the responsible object 1022. For example, the compiled message 1032 can indicate the distance in meters or in yards from the vehicle to the responsible object 1022. In an embodiment, if the compiled message 1032 is a video message, the compiled message 1032 can include an animation showing the deviation of the vehicle from the planned path. In an embodiment, if the compiled message 1032 is a video message, the compiled message 1032 includes video captured by at least one video camera of the vehicle with an annotated augmented reality (AR) overlay.

The broadcasting system 1040 takes as input the compiled message 1032 and presents the compiled message 1032 to one or more occupants in the vehicle, such as passengers, through one or more interfaces, based on the occupants' preferences. In an embodiment, if an occupant prefers audio notification, the broadcasting system 1040 delivers the compiled message 1032 via an available audio interface, such as an in-vehicle speaker or the occupant's headphone. In an embodiment, if an occupant prefers visual notification, the broadcasting system 1040 delivers the compiled message 1032 via an available video interface, such as an in-vehicle screen or the occupant's personal smartphone. In an embodiment, the compiled message 1032 is a video message augmented by an audio warning or explanation. In an embodiment, the occupant has the option to turn-off messaging for the broadcasting system 1040, which prevents the broadcasting system from delivering messages to the occupant. As a result, the occupant is blocked from receiving any notification communicated through messages output by the broadcasting system. In an embodiment, the broadcasting system 1040 transmits the compiled message 1032 to a remote operator (e.g., network-based operator) once a deviation is detected.

In an embodiment, the compiled message 1032 is saved to a log or a database after a deviation happens. In an embodiment, the compiled message 1032 includes timestamps, metadata (e.g., a header or a data size indicator), AV states and/or the like. In an embodiment, the log or the database is part of the database system 410 shown in FIG. 4.

FIG. 11 shows a block diagram 1100 of an example simulation system 1020 used in an autonomous vehicle post-action explanation system 1000 shown in FIG. 10. The simulation system 1020 determines at least one object responsible for the deviation based on the deviation signal 1011, planning data 1012 and/or environment data 1014.

In an embodiment, the deviation signal 1011 is a collision avoidance signal indicating that the vehicle is maneuvering to avoid a collision with a responsible object 1022. In an embodiment, the deviation signal 1011 is a drift signal indicating that the vehicle is drifting from a planned path 1112. In an embodiment, the deviation signal 1011 contains signature information indicating its origin, or where it is generated, such as the AV stack 1016 or the safety system 1018 shown in FIG. 10. In such an embodiment, the signature information of the deviation signal 1011 further indicates the subsystems from which the deviation signal 1011 originates, such as a collision avoidance subsystem or a drifting subsystem of the AV stack 1016.

In an embodiment, the planning data 1012 includes AV states 1110, such as AV poses, or the position and orientation of the AV, and planned path 1112, which is the path planned prior to the deviation.

In an embodiment, the environment data 1014 includes a semantic drivable surface 1114 which is a semantic map indicating a drivable surface in the environment, such as labeled travel lanes, intersections, and/or the like. In an embodiment, the environment data 1014 includes tracked objects 1118. In an embodiment, a tracked object 1118 is associated with an object class, such as a car, a pedestrian, a squirrel, a construction cone and/or the like, and a relative position from the vehicle. In an embodiment, tracked objects 1118 include background objects, such as far away buildings, vegetation and/or the like. In an embodiment, the semantic drivable surface 1114 and the tracked objects 1118 are generated by recognizing and labeling objects in sensor data, such as outputs 504*a-d* shown in FIG. 5. In an embodiment, the recognizing and labeling of objects is performed by the perception system 402 using a neural network, such as VoxNet, PointNet, SegNet, YOLO and/or the like.

The tracked objects 1118 are provided into a track selector and iterator 1120 that is configured to iterate through the tracked objects 1118 and generates a selected object 1122. In an embodiment, the tracked objects 1118 form a queue in the track selector and iterator 1120, where the queue is determined by the distance (e.g., 2D Euclidean distance, 2D Manhattan distance and/or the like) between the objects and the vehicle. In an embodiment, the queue is implemented using standard data structures, such as a queue, a stack, a heap, a list, an array, a binary search tree and/or the like. In an embodiment, objects closer to the vehicle take higher priority in the queue. In an embodiment, additionally, attributes (e.g. speed, velocity, acceleration, activity) of the tracked objects 1118 can be used by the track selector and iterator 1120 to reduce the size of the queue by removing objects that are less likely to be the cause of the deviation, such as inactive (e.g., stationary) and/or distant objects. In an embodiment, the selected object 1122 is the highest priority object taken and removed from the queue. In an embodiment, when a queue of is exhausted and no responsible object 1022 is found, a new queue is constructed by increasing the searching range from the vehicle. For example, when a queue of the tracked objects 1118 within 50 meters of the vehicle is exhausted, a new queue of the tracked objects 1118 from 50 to 100 meters away from the vehicle is constructed. In such embodiment, an object in the new queue can be removed from the new queue by the track selector and iterator 1120 based on the attributes of the object (e.g., when the object has 0 velocity and 0 acceleration). In an embodiment, the queue is formed by all tracked objects 1118 before removing objects from the queue based on the attributes.

A system selector 1130 determines from the deviation signal 1011 a selection signal 1132. In an embodiment, the system selector 1130 extracts from the deviation signal 1011 signature information. In such an embodiment, the signature information of the selection signal 1132 indicates the origin of the deviation signal 1011 (e.g., where the deviation signal 1011 is generated). In an embodiment, a deviation signal 1011 from a collision avoidance subsystem or a drifting subsystem of the AV stack 1016 has different numbers and/or types of components from a deviation signal 1011 from a safety system 1018. In such an embodiment, the number and/or type of components of the deviation signal 1011 is the signature information. In an embodiment, the system selector 1130 determines the origin of the deviation signal 1011, such as a collision avoidance subsystem or a drifting subsystem of the AV stack 1016, or a safety system 1018 based on the signature information. In an embodiment, the selection signal 1132 is used to activate a corresponding subsystem of the simulation system 1020.

The simulation system 1020 includes subsystems such as a first set of simulators 1150 and a second set of simulators 1160. In an embodiment, the first set of simulators 1150 include a collision avoidance simulator 1152 which simulates the motion (e.g., the behavior) of a vehicle with the functions of a collision avoidance subsystem of the AV stack 1016. In an embodiment, the first set of simulators 1150 include a drifting simulator 1154 which simulates the motion of the vehicle with the functions of a drifting subsystem of the AV stack 1016. In an embodiment, the second set of simulators 1160 includes a safety system simulator 1162 which simulates the motion of the vehicle with at least one function of the safety system 1018. Based on the results of the simulations, the simulation system 1020 determines the responsible object 1022.

The simulation system 1020 takes as inputs AV states 1110, planned path 1112, semantic drivable surface 1114, selection signal 1132 and selected object 1122. The selection signal 1132 determines which subsystem of the simulation system 1020 to activate, based on the indicated type and/or origin of the deviation signal 1011. In an example, if the deviation signal 1011 is a collision avoidance signal generated by the collision avoidance subsystem of the AV stack 1016, the selection signal 1132 activates the collision avoidance simulator 1152 of the first set of simulators 1150. In another example, if the deviation signal 1011 is a drifting signal generated by the drifting subsystem of the AV stack 1016, the selection signal 1132 activates the drifting simulator 1154 of the first set of simulators 1150. In yet another example, if the deviation signal 1011 is a collision avoidance signal generated by the safety system 1018, the selection signal 1132 activates the safety system simulator 1162 of the second set of simulators 1160. In an embodiment, each simulator has a backup simulator to ensure the primary simulation system 1020 operates in case of subsystem failure. For example, if the selection signal 1132 activates the drifting simulator 1154 but the drifting simulator 1154 is unavailable, a backup drifting simulator is instead activated which performs identical functions of the drifting simulator 1154.

For each selected object 1122, a subsystem, such as the first set of simulators 1150 or the second set of simulators 1160 of the simulation system 1020, activates based on the selection signal 1132 and simulates the trajectory of the vehicle based on the AV states 1110, planned path 1112 and semantic drivable surface 1114. A simulation environment is built based on the semantic drivable surface 1114. Each simulation generates a trajectory of the vehicle in the simulation environment based on the AV states 1110 and the current selected object 1122. The simulated trajectory in each simulation represents the motion of the vehicle as if only the current selected object 1122 is present in the simulation environment. The simulated trajectory generated in each simulation is compared with the planned path 1112. A deviation in the simulated trajectory is reported if the simulated trajectory is different from the planned path 1112. The selected object 1122 which causes the deviation is determined as the responsible object 1022.

If the current selected object 1122 fails to produce a deviation in the simulated trajectory, the next object in the queue formed by the track selector and iterator 1120 is then selected as the new selected object 1122. If the current queue is exhausted, the first object in the new queue formed by the track selector and iterator 1120 is chosen as the selected object 1122. The system iterates until a selected object 1122 is determined as the responsible object 1022, which causes a deviation in the simulated trajectory of the vehicle. In an embodiment, the simulation is performed at least partially with a remote processor outside the vehicle, such as a processor in the cloud 202 shown in FIG. 2. The responsible object 1022 is then provided as input to the notification system 1030.

In an embodiment, the responsible object 1022 that is determined while simulating using the collision avoidance simulator 1152 is an object close to the vehicle or its planned path, such as a pedestrian crossing a street. In an embodiment, the responsible object 1022 that is determined while simulating using the drifting simulator 1154 is an object, such as construction cones placed on the road.

Figure 12:
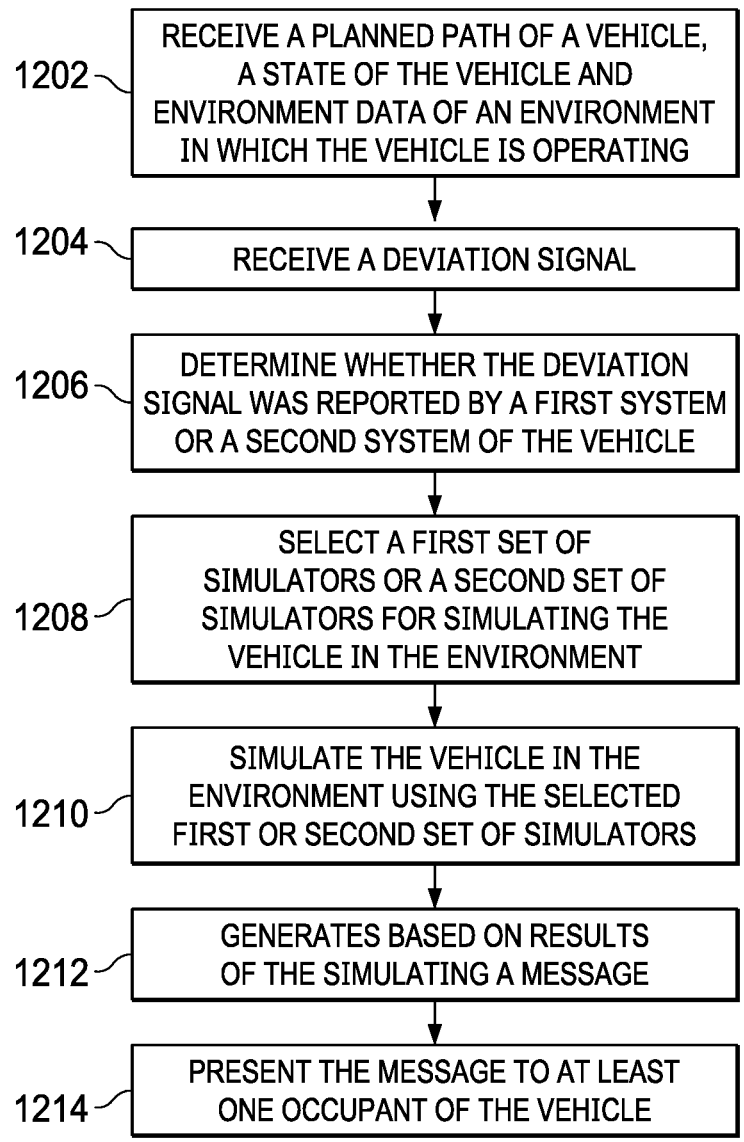
FIG. 12 shows a flowchart of a process for notifying and explaining the action of a vehicle.

FIG. 12 shows a flowchart of a process 1200 for notifying and explaining the action of a vehicle. In an embodiment, the vehicle is the AV 100 shown in FIG. 1. In an implementation, the process 1200 is carried out by a processor such as the processor 304 shown in FIG. 3. In an implementation, the process 1200 is carried out by the perception module 402, the planning module 404, the control module 406 or the localization module 408 shown in FIG. 4.

At block 1202, a planned path of a vehicle, a state of the vehicle, and environment data of an environment in which the vehicle is operating are received. In an implementation, the planned path of the vehicle is the planned path 1112 shown in FIG. 11. In an implementation, the state of the vehicle is the AV states 1110 shown in FIG. 11. In an implementation, the environment data of an environment in which the vehicle is operating is the environment data 1014 shown in FIGS. 10 and 11. In an embodiment, the environment data 1014 includes semantic drivable surface 1114, which is a semantic map indicating a drivable surface in the environment. In an embodiment, the environment data 1014 includes tracked objects 1118, which are identified objects in the environment.

At block 1204, a deviation signal is received. In an implementation, the deviation signal is the deviation signal 1011 shown in FIGS. 10 and 11. In an implementation, the deviation signal 1011 is a drift signal indicating that the vehicle is drifting from the planned path. In an implementation, the deviation signal 1011 is a collision avoidance signal indicating that the vehicle is maneuvering to avoid a collision with the at least one static or dynamic object in the environment.

At block 1206, it is determined whether the deviation signal was reported by a first system or a second system of the vehicle. In an implementation, the first system of the vehicle is the AV stack 1016 shown in FIG. 10. In an implementation, the second system of the vehicle is the safety system 1018 shown in FIG. 10. In an implementation, the determination is performed by the system selector 1130 shown in FIG. 11. In response, at block 1208 a first set of simulators or a second set of simulators for simulating the vehicle in the environment is activated. In an implementation, the activation is based on the selection signal 1132 shown in FIG. 11. In an implementation, the first set of simulators is the first set of simulators 1150 and the second set of simulators is the second set of simulators 1160 shown in FIG. 11. In an implementation, the first set of simulators includes a collision avoidance simulator 1152 for simulating collision avoidance and a drifting simulator 1154 for simulating the vehicle drifting from the planned path, as shown in FIG. 11. In an implementation, the second set of simulators includes at least a safety system simulator 1162 for simulating at least one function of the safety system as shown in FIG. 11.

At block 1210, the vehicle in the environment is simulated using the selected first or second set of simulators. The simulating includes simulating the vehicle and at least one static object or a dynamic object. In an implementation, the simulating is performed by the simulation system 1020 shown in FIGS. 10 and 11. In an implementation, the simulating is performed at least partially with a remote processor outside the vehicle, such as the cloud 202 shown in FIG. 2. In an implementation, the at least one static object or a dynamic object is obtained from the object selector 1120 shown in FIG. 11.

At block 1212, a message is generated based on results of the simulating. In an implementation, the message is a compiled message 1032 shown in FIG. 10. In an implementation, the compiled message 1032 contains audio, video with or without an AR overlay identifying the responsible object 1022 causing the deviation. In an implementation, the responsible object 1022 is a static object, such as a construction cone. In an implementation, the responsible object 1022 is a dynamic object, such as a pedestrian.

At block 1214, the message is presented to at least one occupant of the vehicle. In an implementation, the at least one occupant of the vehicle is a passenger. In an implementation, the message is an audio message which is broadcast through an audio interface. In an implementation, the message is a video message and the presentation is through a display system of the vehicle.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method comprising:
   receiving, with at least one processor, a planned path of an automated vehicle, a state of the automated vehicle and environment data of an environment in which the automated vehicle is operating;
   receiving, with the at least one processor, a deviation signal that represents a deviation from a planned path of the automated vehicle;
   determining, with the at least one processor, whether the deviation signal was reported by a first system or a second system of the automated vehicle;
   in accordance with the deviation signal being reported by the first system of the automated vehicle:

selecting, with the at least one processor, a first set of simulators for simulating a first behavior of the automated vehicle in the environment;

in accordance with the deviation signal being reported by the second system of the vehicle:

selecting, with the at least one processor, a second set of simulators for simulating a second behavior of the automated vehicle in the environment;

simulating, with the at least one processor, the first behavior or the second behavior of the automated vehicle to determine that a current selected object produces a deviation in the simulating using the selected first or second set of simulators, wherein the current selected object is iteratively selected by an iterator until the current selected object is a responsible object that caused the deviation;

generating, with the at least one processor, a message identifying the responsible object causing the deviation; and presenting, with the at least one processor, the message to at least one occupant of the automated vehicle.

2. The method of claim 1, wherein the deviation signal is a drift signal indicating that the automated vehicle is drifting from the planned path.

3. The method of claim 1, wherein the deviation signal is a collision avoidance signal indicating that the automated vehicle is maneuvering to avoid a collision with at least one static or dynamic object in the environment.

4. The method of claim 1, wherein the environment data includes a semantic map indicating a drivable surface in the environment.

5. The method of claim 1, wherein the message is an audio message that is broadcast to the one or more occupants of the automated vehicle.

6. The method of claim 1, wherein the message is a video message that is presented to the at least one occupant of the automated vehicle using a display system of the vehicle.

7. The method of claim 1, wherein the message contains information identifying a static or dynamic object that caused the deviation.

8. The method of claim 7, wherein the message includes a distance measurement between the automated vehicle and the static or dynamic object.

9. The method of claim 1, wherein the message is transmitted to a remote operator.

10. The method of claim 1, wherein the message is saved in a log or a database.

11. The method of claim 1, wherein the first set of simulators includes a first simulator for simulating collision avoidance and a second simulator for simulating the automated vehicle drifting from the planned path.

12. The method of claim 1, wherein the second set of simulators includes at least a third simulator for simulating at least one function of a safety system.

13. The method of claim 1, wherein the simulating is performed at least partially with a remote processor outside the automated vehicle.

14. The method of claim 6, wherein the video message includes an animation showing the deviation of the automated vehicle from the planned path.

15. The method of claim 6, wherein the video message includes a video captured by at least one video camera of the automated vehicle with an annotated augmented reality (AR) overlay.

16. The method of claim 1, wherein prior to presenting the message to the at least one occupant further comprises:

determining that an option to turn-off messaging was not selected by the at least one occupant.

17. The method of claim 1, wherein the first system is a planning system and the second system is a safety system.

18. A method comprising:

receiving, using at least one processor, data indicative of a planned path for an automated vehicle, of current states of the automated vehicle and of an environment in which the automated vehicle operates;

receiving, using the at least one processor, a first deviation signal or a second deviation signal;

iterating, using the at least one processor, over tracked objects to generate a currently selected object for respective simulations;

in accordance with receiving a first deviation signal:

simulating, using a first simulator with the data as input, motion of the automated vehicle and the current selected object to determine whether the current selected object is a responsible object that caused the deviation of the automated vehicle from the planned path;

in accordance with receiving a second deviation signal:

simulating, using a second simulator with the data as input, motion of the automated vehicle and the current selected object to determine whether the current selected object is a responsible object that caused the deviation of the automated vehicle from the planned path; and presenting, using the at least one processor, a message to an occupant in the automated vehicle, the message indicative of the deviation from the planned path and the responsible object identified as a reason for the deviation.

19. The method of claim 18, further comprising:

determining, using the at least one processor, whether the first simulator is not available;

in accordance with a malfunction of the first simulator and the first deviation signal being received:

simulating, using a backup first simulator with the data as input, motion of the automated vehicle and the object to determine whether the object caused the deviation of the automated vehicle from the planned path; and in accordance with a malfunction of the second simulator and the second deviation signal being received:

simulating, using a backup second simulator with the data as input, motion of the automated vehicle and the object to determine whether the object caused the deviation of the automated vehicle from the planned path.

20. The method of claim 18, wherein the first simulator simulates the automated vehicle drifting from the planned path and the second simulator simulates the automated vehicle avoiding collision with the object.

* * * * *